(12) United States Patent
Arora et al.

(10) Patent No.: US 7,565,412 B2
(45) Date of Patent: Jul. 21, 2009

(54) METHODS FOR DETECTING OUTBOUND NAGLING ON A TCP NETWORK CONNECTION

(75) Inventors: Rajiv Arora, Austin, TX (US); Jesse M. Gordon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/054,733

(22) Filed: Mar. 25, 2008

(65) Prior Publication Data

US 2008/0177862 A1 Jul. 24, 2008

Related U.S. Application Data

(63) Continuation of application No. 11/044,596, filed on Jan. 27, 2005.

(51) Int. Cl.
G06F 15/16 (2006.01)
(52) U.S. Cl. .................................. 709/218; 709/235
(58) Field of Classification Search ................ 709/218, 709/235; 714/4
See application file for complete search history.

(56) References Cited

U.S. PATENT DOCUMENTS

| 7,266,613 B1 * | 9/2007 | Brown et al. ............. 709/235 |
| 7,403,542 B1 * | 7/2008 | Thompson ................ 370/474 |
| 2003/0110206 A1 | 6/2003 | Osokine |
| 2005/0265235 A1 * | 12/2005 | Accapadi et al. ........... 370/235 |

FOREIGN PATENT DOCUMENTS

EP 1 179 925 A2 2/2002

OTHER PUBLICATIONS

Minshall, Greg et al., "Application Performance Pitfalls and TCP's Nagle Algorithm," Mar. 1, 1999, pp. 1-7.
Mogul, Jeffrey C., et al., "Rethinking the TCP Nagle Algorithm," ACM SIGCOMM, Computer Communication Review, vol. 31, Issue 1, Jan. 2001, pp. 6-20.

* cited by examiner

*Primary Examiner*—Andrew Caldwell
*Assistant Examiner*—Jason Recek
(74) *Attorney, Agent, or Firm*—Herman Rodriguez; Schubert Osterrieder & Nickelson PLLC

(57) ABSTRACT

Methods for detecting outbound Nagling on a TCP network connection are disclosed. Embodiments may include creating by a sender computer one or more segments to be transmitted to a receiver computer and determining by the sender computer whether any of the one or more segments to be transmitted are small segments and determining whether a previously transmitted small segment is unacknowledged by the receiver computer. If the previously transmitted small segment is unacknowledged by the receiver computer and at least one of the segments to be transmitted is a small segment, embodiments may also include detecting by the sender computer a Nagling condition on the network connection. Further embodiments may include modifying a Nagle algorithm configuration of the network connection in response to the detected Nagling condition by turning off the Nagle algorithm or reducing a delayed acknowledgement timer for the network connection.

10 Claims, 4 Drawing Sheets

METHODS FOR DETECTING OUTBOUND NAGLING ON A TCP NETWORK CONNECTION

CROSS-REFERENCES TO RELATED APPLICATIONS

This application is a continuation of U.S. Appl. No. 11/044,596, filed Jan. 27, 2005, now U.S. Pat. No. 7,526,531.

Pursuant to 35 USC § 120, this continuation application claims priority to and benefit of U.S. patent application Ser. No. 11/044,596, entitled "SYSTEMS, METHODS, AND MEDIA FOR DETECTING OUTBOUND NAGLING ON A TCP NETWORK CONNECTION", filed on Jan. 27, 2005, the disclosure of which is incorporated herein in its entirety for all purposes.

FIELD OF INVENTION

The present invention is in the field of computer systems. More particularly, the present invention relates to methods for managing a Transmission Control Protocol (TCP) network connection, particularly for managing TCP network connections implementing Nagle algorithm [RFC 896] mechanisms.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having one or more central processing units (CPUs) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. Examples of such personal computer systems are International Business Machine Corp.'s (IBM's) ThinkCentre™, ThinkPad™, Aptiva™, and IntelliStation™ series of personal computers.

PCs and other computer systems have also become increasingly connected by networks such as the Internet, intranets, Wide Area Networks (WANs), and Local Area Networks (LANs). Networks often use one or more protocols to facilitate communication between computers within the network and on other networks. Protocols such as the Internet Protocol (IP) and TCP are preestablished means of communication between computers on a network. IP allows for routing of packets of data (including both data and a header) from node to node, forwarding data packets based on a four byte destination address (the IP number). TCP creates a reliable communications stream on top of the somewhat unreliable packet IP (called TCP/IP when they are combined). TCP adds support to detect errors or lost data and to trigger retransmission until data is correctly and completely received. TCP treats data as a stream of bytes that includes a header that designates a starling byte and a size, allowing the receiver to detect missing or incorrectly sequenced packets.

Once a TCP connection is established, most transmissions ultimately result in a response (such as an ACK, or acknowledgement) from the receiver. Given the overheads associated with both TCP and IP, explicit acknowledgement of every transmission, however, could generate significant additional traffic. TCP therefore attempts to inject the fewest possible packets into the network to avoid congesting the network and adding load to routers and switches. A packet may be broken into multiple segments for ease of transmission. A "small" segment is any segment smaller than the Maximum Segment Size (MSS) negotiated by the sender and receiver when the TCP connection is established. The Nagle algorithm [described in Request for Comments (RFC) 896 of the Network Working Group entitled "Congestion Control in IP/TCP Internetworks", Jan. 6, 1984] is one mechanism used by TCP to reduce the number of acknowledgements transmitted over a network connection. The Nagle algorithm, when implemented, requires that a sender not have more than one unacknowledged small segment outstanding. When an unacknowledged small segment is outstanding, the sender holds any further data from an application until the outstanding segment is acknowledged by the receiver. TCP allows the receiver to possibly attach the acknowledgement to another response (a process also known as 'piggybacking'), eliminating the need for two transmissions and thus reducing the load on the network. When a TCP connection has primarily one-way communication, the opportunities for attaching the acknowledgement are limited. The Nagle algorithm thus often results in only one small segment being transmitted on a given connection per round trip time (RTT), which is the time it takes to transmit data and subsequently receive acknowledgement for that data, an undesirable delay in transmission in many instances.

The delays caused by the RTT when transmitting small segments are exacerbated by TCP's delayed acknowledgement policy. The traditional receiver TCP implementation delays sending an acknowledgement to a sender until it has data to send on the reverse path (allowing it to attach the ACK to the data), until it has at least two fill-sized segments (2 times MSS bytes) to acknowledge, or until expiration of a delayed acknowledgement timer (typically about 200 milliseconds). When a sender transmits a small segment, the acknowledgement is typically not transmitted until expiration of the delayed acknowledgement timer, resulting in delays of hundreds of milliseconds on operations that should complete much faster and providing additional delays on top of the RTT time. Other delays are also possible because of the delayed acknowledgement timer, such as delays occurring in some operating systems (OS's) when a sender attempts to transmit a packet with a size larger than the OS network buffer size, which may result in one small segment remaining unacknowledged until expiration of the delayed acknowledgement timer.

The delay caused by the delayed acknowledgement time is particularly undesirable in situations with primarily one-way communication as acknowledgements of small segments will rarely be able to piggyback with other data. Because of the problems associated with the Nagle algorithm with some network connections, some application developers simply turn off the Nagle algorithm for a given network connection by using the TCP_NODELAY socket option. Additionally, system administrators on some operating systems can turn off the Nagle algorithm using OS tuning parameters. While for some applications this improves performance, for many applications turning off the Nagle algorithm will lead to increased stress of the network, particularly when some senders on the network have faulty output buffer management. Simply turning off the Nagle algorithm does not provide a satisfactory solution to Nagle-induced slowdown as turning off the Nagle algorithm can often slow down the network more than the Nagle algorithm itself. Moreover, turning off the Nagle algorithm also results in the loss of the benefits provided by the Nagle algorithm.

Another problem with turning off the Nagle algorithm is that this solution requires a correct diagnosis of a Nagle-induced slowdown in the first place. Current operating systems do not recognize when slowdowns are the result of Nagle-induced delays. When a network slowdown occurs, an administrator may not know what is causing the slowdown without having to analyze logs or to perform trace analysis. Even when a network slowdown can be improved by turning off the Nagle algorithm, administrators cannot determine quickly that this solution will provide a benefit, resulting in it being often ignored.

There is, therefore, a need for an effective mechanism for detecting and managing the use of the Nagle algorithm in TCP networks, particularly when those networks are susceptible to Nagle-induced slowdowns. There is an even greater need for such a mechanism when applications are inefficient in their transmission of data packets.

SUMMARY

Methods for detecting outbound Nagling on a TCP network connection are disclosed. One embodiment includes creating by a sender computer one or more segments to be transmitted to a receiver computer and determining by the sender computer whether any of the one or more segments to be transmitted are small segments and determining whether a previously transmitted small segment is unacknowledged by the receiver computer. If the previously transmitted small segment is unacknowledged by the receiver computer and at least one of the segments to be transmitted is a small segment, embodiments may also include detecting by the sender computer a Nagling condition on the network connection. Further embodiments may include modifying a Nagle algorithm configuration of the network connection in response to the detected Nagling condition by one or more of turning off the Nagle algorithm for the network connection or reducing a delayed acknowledgement timer for the network connection. In further embodiments, the detecting step may include generating and transmitting by the sender computer a notification of the Nagling condition, incrementing by the sender computer a Nagle monitor counter, displaying by the sender computer an indication that the Nagling condition exists, or recording an indication of the Nagling condition by a sender computer in a log.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods for detecting outbound Nagling on a TCP network connection are disclosed. Embodiments may include creating by a sender computer one or more segments to be transmitted to a receiver computer and determining by the sender computer whether any of the one or more segments to be transmitted are small segments and determining whether a previously transmitted small segment is unacknowledged by the receiver computer. If the previously transmitted small segment is unacknowledged by the receiver computer and at least one of the segments to be transmitted is a small segment, embodiments may also include detecting by the sender computer a Nagling condition on the network connection. Further embodiments may include modifying a Nagle algorithm configuration of the network connection in response to the detected Nagling condition by one or more of turning off the Nagle algorithm for the network connection or reducing a delayed acknowledgement timer for the network connection.

By detecting a Nagling condition on the network connection, the Nagle detection system of the disclosed embodiments provides an effective mechanism for users or administrators to diagnose and possibly correct network problems. The Nagle detection system of the disclosed embodiments provides a deterministic algorithm on the sender side of the network connection for detecting delays caused by the Nagle algorithm. In one example, if a network slowdown occurs, an administrator of a sender computer may diagnose delays caused by the Nagle algorithm in real-time using the disclosed Nagle detection system, allowing for a quicker and more accurate diagnosis of the network condition than having an administrator analyze of sift through logs after the fact.

While specific embodiments will be described below with reference to particular configurations of hardware and/or software, those of skill in the art will realize that embodiments of the present invention may advantageously be implemented with other substantially equivalent hardware and/or software systems.

Figure 1:
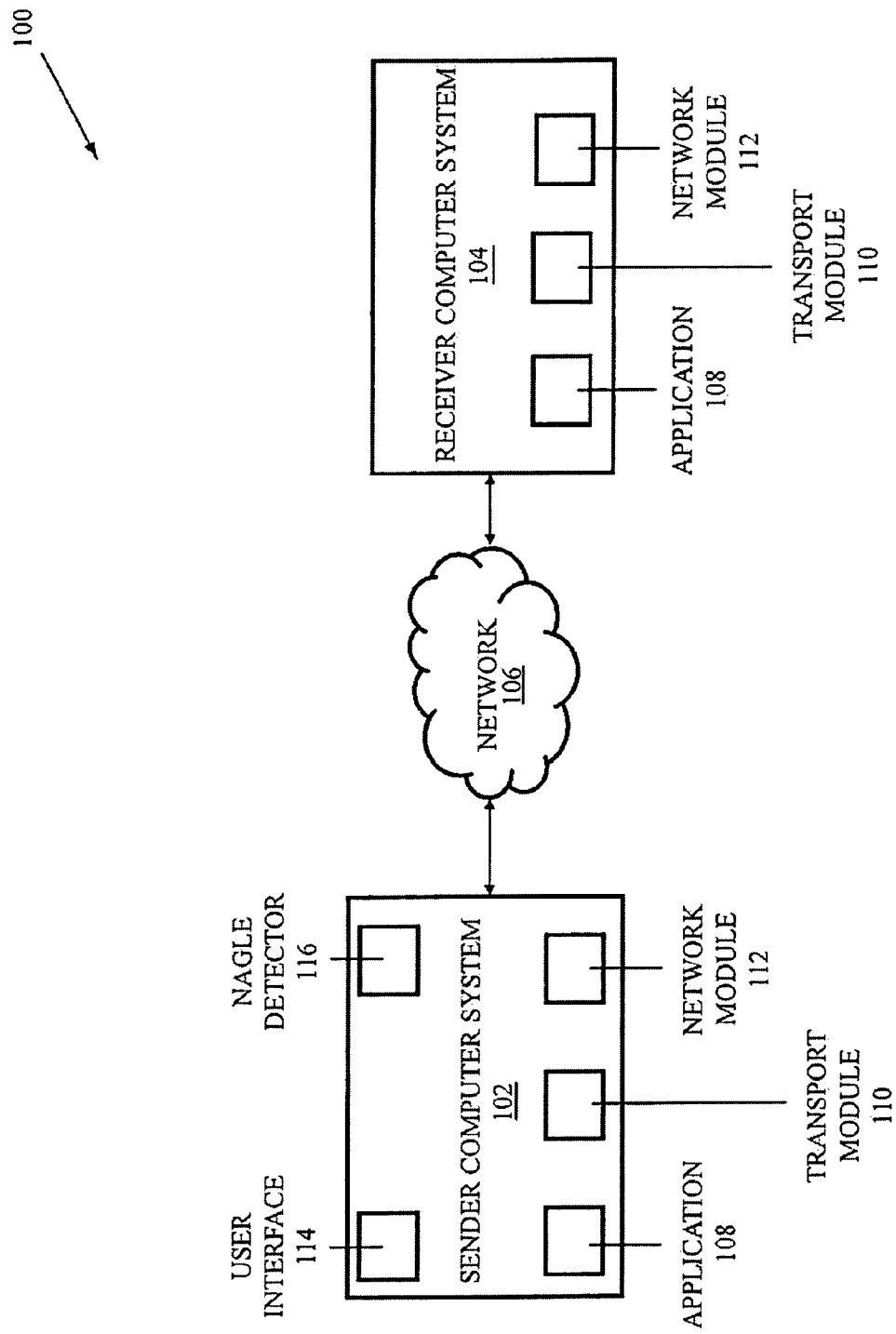
FIG. 1 depicts an environment for a Nagle detection system according to one embodiment.

Turning now to the drawings, FIG. 1 depicts an environment for a Nagle detection system according to one embodiment. In the depicted embodiment, Nagle detection system 100 includes a sender computer system 102 (sender computer) in communication with a receiver computer system 104 via a network 106. The sender computer system 102 may include an application 108, a transport module 110, and a network module 112. Similarly, receiver computer system 104 (receiver computer) may include an application 108, a transport module 110, and a network module 112. The sender computer system 102 may also include a user interface 114 and a Nagle detector 116. In the depicted embodiment, the sender computer system 102 may transmit data via a network connection on network 106 to the receiver computer system 104 utilizing a protocol such as TCP. The Nagle detector 116 of the sender computer system 102 may detect when the Nagle algorithm is being implemented (and potentially causing a slowdown in performance of the network connection) in addition to generating a warning of the Nagling condition. The user interface 114 may facilitate receipt of input from a user or administrator as well as communication of information to the user or administrator.

The sender computer system 102 and the receiver computer system 104 may be one or more of any type of computer system, including servers, personal computers, workstations, mainframe computers, notebook or laptop computers, desktop computers, or the like. The sender computer system 102 may be the same type of computer system or a different type of computer system than the receiver computer system 104. In one embodiment, the receiver computer system 104 is an IBM® eServer or similar server having one or more processors, or threads of processors, executing software and/or one or more state machines coupled with data storage devices such as random access memory (RAM), read only memory (ROM), flash memory, compact disk drives, hard drives, and the like. In this embodiment, the receiver computer system 104 may be in communication with (and have network connections with) a plurality of sender computer systems 102. In this embodiment, each sender computer system 102 may be, for example, an IBM® ThinkCentre™ or ThinkPad™ personal computer system having one or more processors, or threads of processors, executing software and/or one or more state machines coupled with data storage devices such as RAM, ROM, flash memory, compact disk drives, hard drives, and the like. The sender computer system 102 and the receiver computer system 104 may be located at the same location, such as in the same building or computer lab, or could be remote. While the term "remote" is used with reference to the distance between the components of the Nagle detection system 100, the term is used in the sense of indicating separation of some sort, rather than in the sense of indicating a large physical distance between the systems.

Network 106 may be any type of data communications channel, such as the Internet, an intranet, a LAN, a WAN, an Ethernet network, or a wireless network. In one embodiment, network 106 utilizes the TCP/IP protocols. Those skilled in the art will recognize, however, that types of data communication channels between the sender computer system 102 and the receiver computer system 104 may be used without departure from the scope and spirit of the invention.

A computer network at its most basic level is a series of connections between computers which allow them to communicate. Protocols such as TCP and IP are preestablished mechanisms for communication over a network that help define the speed, content, and reliability of the network. A computer system using the TCP/IP protocol may use packets as a basic unit of transmission over network 106. A packet may typically include data and header information, such as checksums, protocol identifiers, destination and source addresses, and state information. A packet may be broken up into multiple segments for transmission.

TCP/IP breaks up the full network protocol suite into a number of tasks (some of which are performed by a transport module 110 or network module 112) so that each application 108 need not have a full network protocol implementation and instead can rely on other 'layers' of the network protocol. TCP/IP generally includes a link layer, a network layer, a transport layer, and an application layer. Each layer may add its own header information to facilitate handling of data. An application 108 may be any software program that serves as the application layer. In one example, an application 108 may facilitate a user transmitting or receiving data via network 106 by sending and receiving data from the transport layer of the transport module 110. Applications 108 may include communications programs such as telnet, file transfer protocol (ftp), e-mail programs, Internet Relay Chat (IRC), and web browsers.

The transport layer, which may be implemented by a transport module 110, may provide data flows and guarantees of reliability for the application layer (which may be implemented by application 108). The transport module 110 may use the TCP protocol to help it ensure that packets are received in the order they are sent and that lost packets are retransmitted. An application 108 may use the transport module 110 to interact with the network module 112 and, thus, network 106.

The network layer may be implemented by a network module 112 and may determine how to get data to its intended destination. The network module 112 may use the IP protocol in one embodiment to send and receive packets of data. When data to be transmitted from a computer system is received from a transport module 110, the network module 112 may determine where to transmit a packet based on an IP address and how to route the packet in order to get it to its destination. When a network module 112 receives data from the link layer (which receives it from the network 106), it may hand the packet to the transport layer of the transport module 110 (discarding it in some situations if there is a problem with the packet). The link layer may be used for communicating with the actual network hardware, such as Ethernet or other network cards, and may include hardware device drivers. The link layer may receive data from the network 106, strip off any link layer header information and hand the data to the network layer of the network module 112. The link layer may also receive data from the network module 112, place a link layer header on the data, and put it on the network 106.

The user interface 114 of the sender computer system 102 may receive input from a user of the sender computer system 102, such as requests to turn the Nagle detector 116 on or off or requests to change settings of the Nagle detector 116. The user interface 114 may include user input devices such as keyboards, mouse, voice-activated input, and the like to receive user input. The user interface 114 may also communicate information, such as Nagle algorithm-related statistics or current settings, to a user of the sender computer system 102 via any type of communication device, such as a display or speaker.

The Nagle detector 116 may determine when the Nagle algorithm is being triggered (i.e., when a Nagling condition exists) and either generate a warning or take a different action in response. The Nagle detector 116 may interact with the transport module 110 as the Nagle algorithm is typically implemented in the transport layer. Alternatively, the transport module 110 may include the Nagle detector 116. The Nagle detector 116 may determine, based on the activity of the transport module 110, whether an attempt is made to send a small segment of data when there is an outstanding, unacknowledged small segment on the network connection between the sender computer system 102 and the receiver computer system 104. A small segment of data is any segment smaller than the negotiated TCP MSS for the network connection. Such an attempt provides a strong indication that the transmission of the second segment is being delayed by the Nagle algorithm being implemented by the transport module 110.

Once the Nagle detector 116 detects a Nagling condition, it may generate a warning or take other action in response. In one embodiment, the Nagle detector 116 may generate and transmit a warning of the Nagling condition to a user, administrator, or performance monitoring and/or analysis software. In an alternative embodiment, the Nagle detector 116 may generate and transmit a warning of the Nagling condition to the receiver computer system 104. The receiver computer system 104 (or an administrator or other user) may use the warning to diagnose problems on the network, to identify sender computer systems 102 that have inefficient applications 108, or for any other purpose. This may be particularly useful when a receiver computer system 104 is in communication with a large number of sender computer systems 102 with unsophisticated users, as an operator of the receiver computer system 104 may be able to quickly diagnose Nagle-induced slowdowns caused by sender computer systems 102. In another embodiment, the Nagle detector 116 may record an indication of the Nagling condition, such as by recording in a log or incrementing a Nagle monitor counter. This allows an administrator or other use to quickly find a record of how often a Nagling conditions has occurred without having to intuit the information from a log or analyze logs or reports after the fact.

In another embodiment, the Nagle detector 116 may transmit a warning of a Nagling condition to the application 108 requesting the data transmission. The warning in this embodiment may be a return code or other programmatic indication that Nagling is occurring. An application 108 may need to be modified to await receipt of the warning. In one embodiment, the application 108 may, after receiving a warning, then notify a user (such as via user interface 114) of the Nagling condition. In other embodiments, the application 108 may be modified (such as via user request) to change its data transmission requests to reduce the possibility of creating future Nagling conditions. For example, if an application 108 is requesting a large number of small data transmissions, it could modify its requests, in some cases, so that it requests larger transmissions, thereby reducing the incidences of Nagling-induced delays. The application 108 in this embodiment may also be a self-healing application that responds to the Nagle warnings by modifying its buffer management policies. In another embodiments an application 108 may turn off the Nagle algorithm at the application level for the particular network connection where Nagling is occurring.

The disclosed embodiments of the Nagle detection system 100 provide an efficient and effective way of detecting a Nagling condition and managing a network connection. The methodology of the disclosed embodiments provides a deterministic algorithm that may precisely determine when the Nagle algorithm is causing delays in transmitting small segments. By detecting a Nagling condition and generating a warning, the Nagle detection system 100 provides an efficient sender-side mechanism for analyzing network performance, diagnosing network slowdowns, and possibly improving network performance. The Nagling condition warning may, in one embodiment, alert a user or network administrator of a sender computer system 102 or a receiver computer system 104, allowing them to take corrective action or to diagnose problems. In another embodiment, the Nagle detector 116 may record a history of the Nagling conditions as they occur for ease of later analysis. When compared to existing systems, the Nagle detection system 100 of the disclosed embodiments provides users or administrators a valuable insight into the operation of the Nagle algorithm on the network connection, facilitating diagnosis or correction of Nagle-induced slowdowns.

Figure 2:
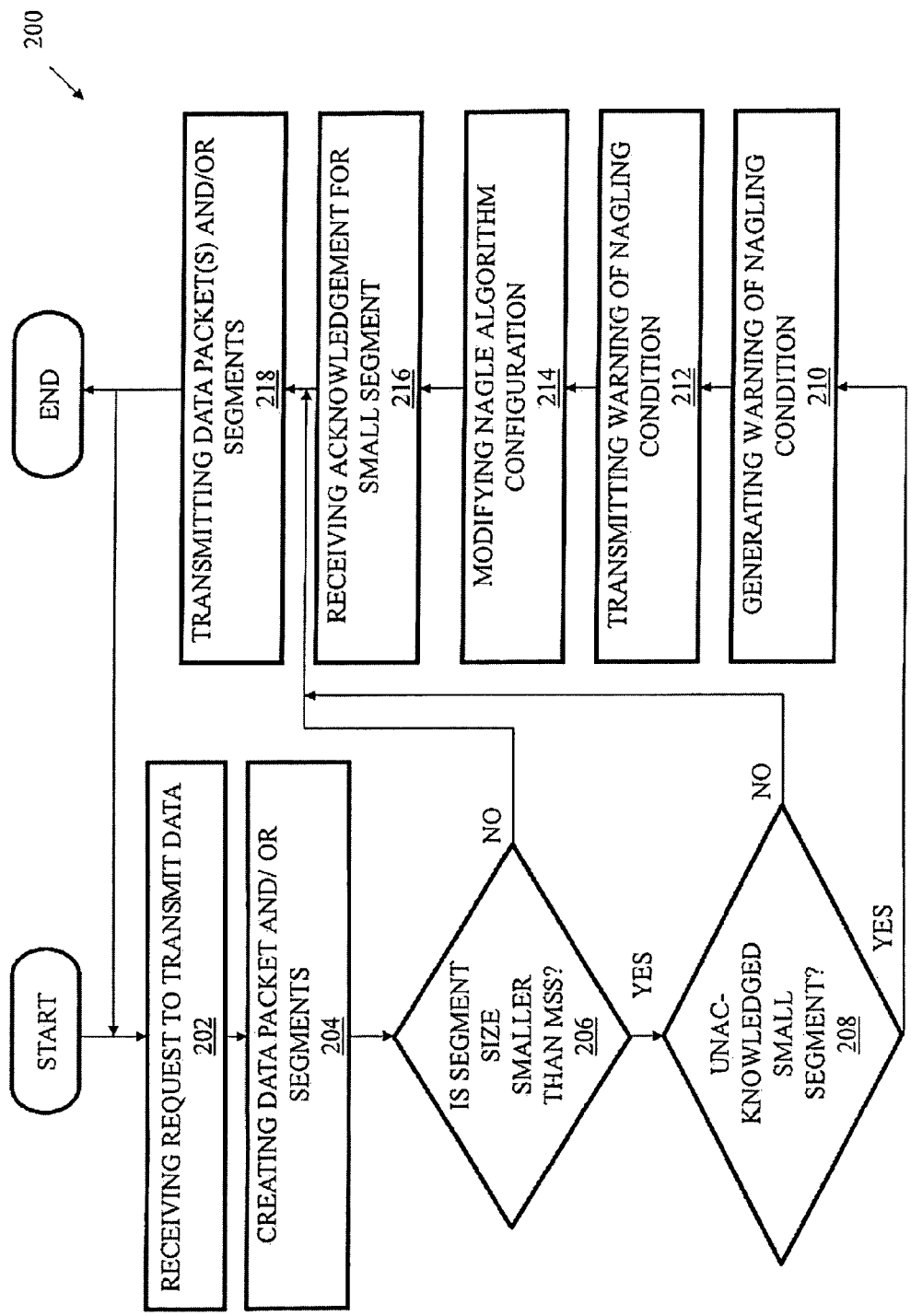
FIG. 2 depicts an example of a flow chart for detecting a Nagling condition and generating and transmitting a notification of the condition according to one embodiment.

FIG. 2 depicts an example of a flow chart for detecting a Nagling condition and generating and transmitting a notification of the condition according to one embodiment. The elements of the method of flow chart 200 may be performed by components of a sender computer system 102 in one embodiment. At element 202, a component of the sender computer system 102, such as the transport module 110, may receive a request to transmit data to a receiver computer system 104. The request may be received from any source, such as from a user via user interface 114 or an application 108.

At element 202, the transport module 110 may create one or more data packets 110 and/or segments based on the data to be transmitted. The transport module 110 may insert data and header information, such as checksums, protocol identifiers, destination and source addresses, and state information, into the packet. The number and size of the data packets and/or segments are determined based on a variety of factors, including the MSS for the network connection and the OS network buffer size.

Once the packet has been broken into segments, the transport module 110 may determine when a particular segment to be transmitted is smaller than the MSS. If the segment is not smaller than the MSS, the method continues to element 218 where the segment is handed to the network module 112 and transmitted to the receiver computer system 104. If the segment is smaller than the MSS, the method continues to element 208. At element 208, the transport module 110 may determine whether a small segment has been transmitted that has not yet been acknowledged by the receiver computer system 104. If there are no unacknowledged small segments pending, the method continues to element 218 where the segment is transmitted to the receiver computer system 104. If there is an unacknowledged small segment outstanding, the method continues to element 210. Under a traditional Nagle algorithm, the existence of an unacknowledged small segment when a transport module 110 is attempting to transmit a second small segment will result in the delay of the transmission of the second segment until an acknowledgement of the first is received.

At element 210, a Nagling condition is detected and the Nagle detector 116 may optionally generate a warning of the Nagling condition and may then transmit the warning at element 212. As described above, the warning may be transmitted to a user, administrator, an application 108, or performance monitoring and/or analysis software, any of which may be located at or associated with a sender computer system 102, a receiver computer system 104, or any other computer system. The warning of the Nagling condition may serve to assist user or administrators in analyzing network performance and diagnosing slowdowns in network performance. In one embodiment, a user or administrator may use a real-time performance analysis tool that, upon receiving notifications of Nagling conditions, creates a real-time display showing the frequency of occurrence of the Nagling conditions or other performance information. Using such software, a user or administrator could quickly diagnose whether a network slowdown was Nagle-induced. The warning may include any type of information, such as information relating to the receiver computer system (such as IP address, port number, or other identifier), the identity of the application 108 sending the data, or a timestamp.

At optional element 214, the transport module 110 may modify the Nagle algorithm configuration in response to the warning of a Nagling condition or other factors. The Nagle algorithm configuration may be modified, for example, when the frequency of Nagling condition occurrences passes a defined threshold. The Nagle algorithm configuration may be modified in any appropriate fashion, such as by turning off the Nagle algorithm on a particular network connection or making it more difficult to trigger. For example, if a Nagling condition is being triggered too frequently, the transport module 110 may turn off the Nagle algorithm for the network connection (such as via the TCP_NODELAY socket option) so that the excessive Nagling occurrences do not unduly slow the network. In another example, the transport module 110 may reduce the delayed acknowledge timer so that Nagle-induced delays are reduced. Alternatively, the Nagle detector 116 or application 108 may also modify the Nagle algorithm configuration. This optional element may also be useful in other embodiments, such as that of flow charts 300 and 400 of FIGS. 3 and 4, respectively.

After the transport module 110 transmits the warning of the Nagling condition, it continues to element 216. At element 216, the transport module 110 receives an acknowledgement that the previously unacknowledged small segment has been acknowledged by receiver computer system 104. The transport module 110 may receive the acknowledgement from the receiver computer system 104 via network module 112. Once the acknowledgement has been received, the transport module 110 may then transmit the small segment that has been delayed at element 218. After element 218, the method may either terminate or return to element 202 for continued transmission of data.

Figure 3:
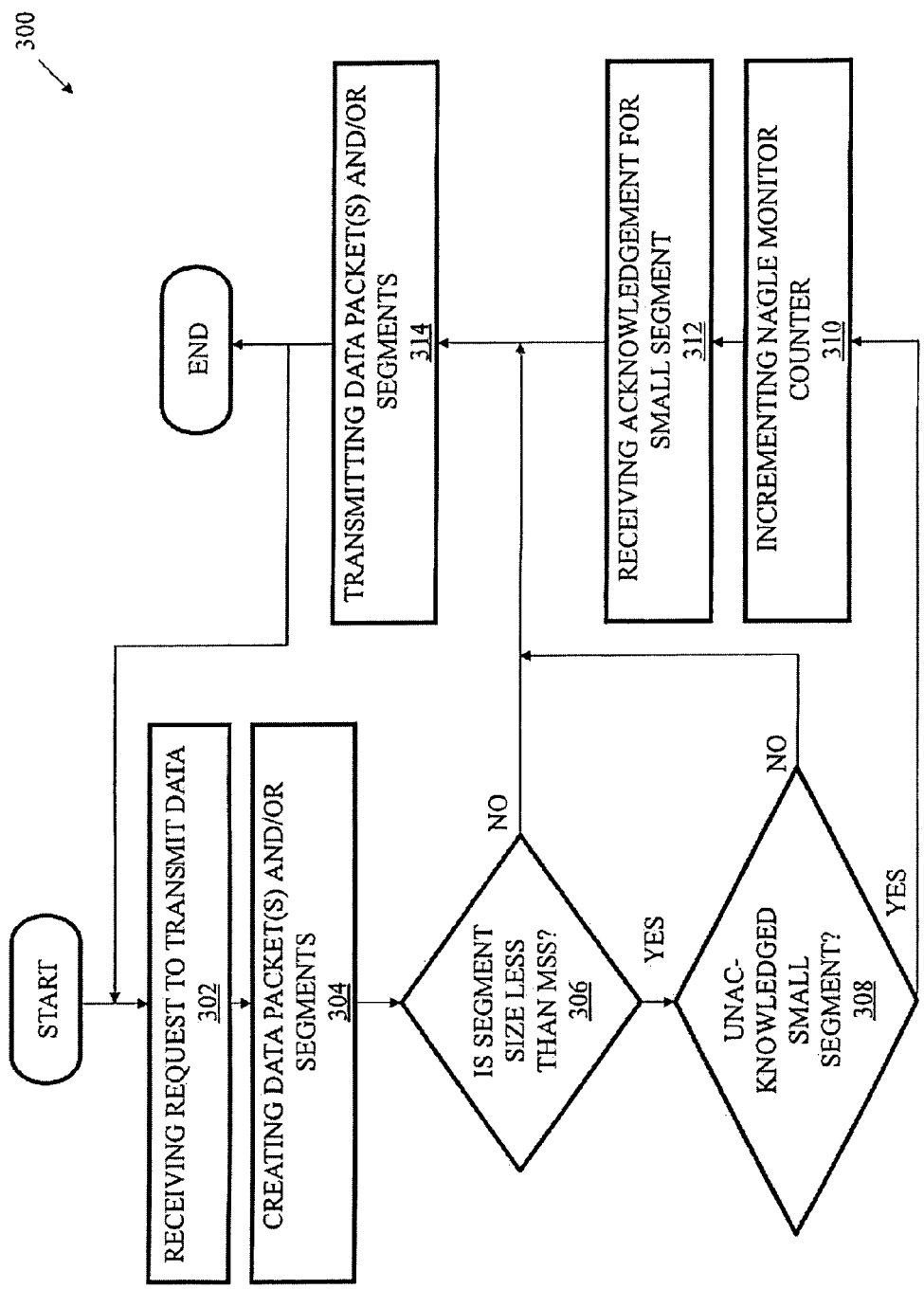
FIG. 3 depicts an example of a flow chart for detecting a Nagling condition and incrementing a Nagle monitor counter according to one embodiment.

FIG. 3 depicts an example of a flow chart for detecting a Nagling condition and incrementing a Nagle monitor counter according to one embodiment. The elements of the method of flow chart 300 may be performed by components of a sender computer system 102 in one embodiment. Flow chart 300 begins with elements 302, 304, 306, and 308, which are substantially similar to the similarly numbered elements of the method of flow chart 200. An affirmative response at decision block 308 indicates that a Nagling condition exists, as the segment to be transmitted would be a small segment and there would be an unacknowledged small segment as well. At element 310, the Nagle detector 116 of the sender computer system 102 or other component would then increment a Nagle monitor counter in response to the Nagling condition identified in decision blocks 306 and 308. Alternatively, the transport module 110 may increment the Nagle monitor counter instead of the Nagle detector 116.

The Nagle monitor counter may be part of the transport module 110, the Nagle detector 116, or any other software located on the sender computer system 102. In one embodiment, the Nagle monitor counter may be implemented as an operating system (OS) counter that may be accessed by a utility. For example, the netstat command in the Linux and Unix OS's may serve as a mechanism for maintaining a Nagle monitor counter. A utility of the sender computer system 102 could then access the information for communication to a user or administrator. In another embodiment, the Nagle monitor counter may instead be located on the receiver computer system 104, necessitating transmitting an indication of a request to increment the Nagle monitor counter from the sender computer system 102 to the receiver computer system 104. A Nagle monitor counter allows a user or administrator to quickly determine how often the Nagle algorithm is delaying transmission of small segments so that the individual can diagnose network problems or improve the performance of the network connection.

After the Nagle monitor counter has been incremented, the method of flow chart 300 continues to element 312. At element 312, the transport module 110 receives an acknowledgement that the previously unacknowledged small segment has been acknowledged by receiver computer system 104. The transport module 110 may receive the acknowledgement from the receiver computer system 104 via network module 112. Once the acknowledgement has been received, the transport module 110 may then transmit the small segment that has been delayed at element 314. After element 314, the method may either terminate or return to element 302 for continued transmission of data.

Figure 4:
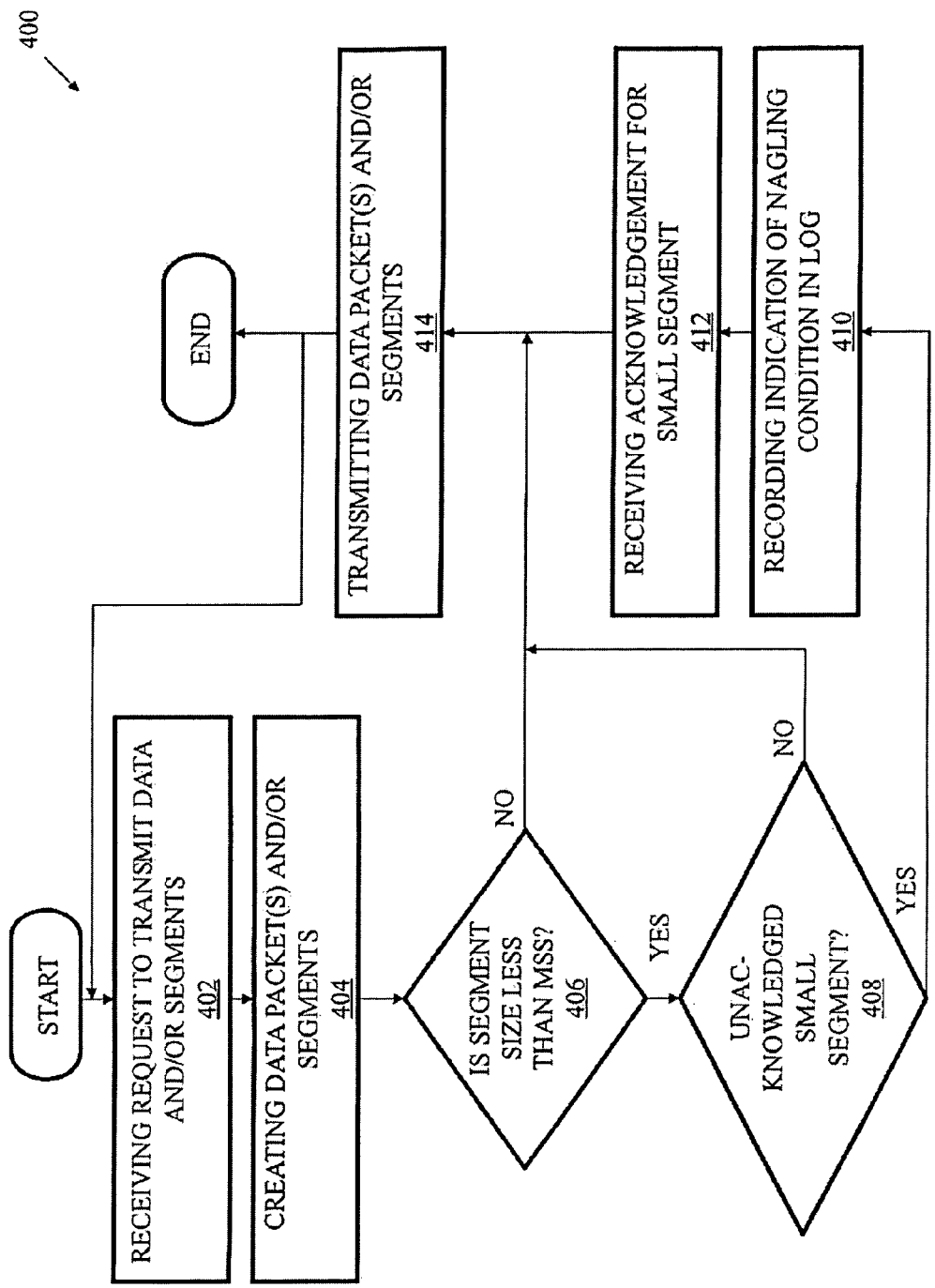
FIG. 4 depicts an example of a flow chart for detecting a Nagling condition and recording an indication of the Nagling condition in a log according to one embodiment.

FIG. 4 depicts an example of a flow chart for detecting a Nagling condition and recording an indication of the Nagling condition in a log according to one embodiment. The elements of the method of flow chart 400 may be performed by components of a sender computer system 102 in one embodiment. Flow chart 400 begins with elements 402, 404, 406, and 408, which are substantially similar to the similarly numbered elements of the method of flow chart 200. An affirmative response at decision block 408 indicates that a Nagling condition exists, as the segment to be transmitted would be a small segment and there would be an unacknowledged small segment as well. At element 410, the Nagle detector 116 of the sender computer system 102 or other component would then record an indication of the Nagling condition in a log in response to the Nagling condition identified in decision blocks 406 and 408. Alternatively, the transport module 110 may record the indication of the Nagling condition in a log, such as a system event monitor or an event log, instead of the Nagle detector 116. By recording a history of Nagling conditions for a network connection, administrators or users may quickly determine how often the Nagle algorithm is delaying transmission of small segments so that an individual can diagnose network problems without having to sift through long event logs to try to analyze or intuit the cause of network slowdowns.

After the indication of the Nagling conditions has been recorded in a log, the method of flow chart 400 continues to element 412. At element 412, the transport module 110 receives an acknowledgement that the previously unacknowledged small segment has been acknowledged by receiver computer system 104. Once the acknowledgement has been received, the transport module 110 may then transmit the small segment that has been delayed at element 414, after which the method may either terminate or return to element 302 for continued transmission of data.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for detecting outbound Nagling on a TCP network connection. It is understood that the form of the invention shown and described in the detailed description and the drawings are to be taken merely as examples. It is intended that the following claims be interpreted broadly to embrace all the variations of the example embodiments disclosed.

What is claimed is:

1. A method for detecting a Nagling condition on a Transmission Control Protocol (TCP) network connection, the method comprising:

receiving, by transport module of a sender computer system, a request from a sending application to transmit data over a network connection to a receiver computer system;

creating by the transport module one or more segments to be transmitted to the receiver computer system via the network connection;

determining by the transport module whether any of the one or more segments to be transmitted are small segments and whether a previously transmitted small segment is unacknowledged by the receiver computer;

if the previously transmitted small segment is unacknowledged by the receiver computer and at least one of the segments to be transmitted is a small segment, detecting by a Nagle detector of the sender computer system a Nagling condition on the network connection; and in response to detecting a Nagling condition on the network connection, transmitting by the Nagle detector a warning of the detected Nagling condition, the warning comprising both an indication of the receiver computer system and an indication of the sending application.

2. The method of claim 1, further comprising transmitting by the sender computer system the one or more segments to be transmitted after receiving an acknowledgement from the receiver computer system for the previously transmitted small segment.

3. The method of claim 1, wherein the creating step comprises creating by the sender computer system one or more segments to be transmitted to the receiver computer system in response to the received request.

4. The method of claim 1, wherein determining by the sender computer system whether any of the one or more segments to be transmitted are small segments comprises determining by the sender computer system whether any of the one or more segments are smaller than a maximum segment size (MSS) of the network connection.

5. The method of claim 1, wherein the warning is transmitted to the receiver computer system.

6. The method of claim 1, wherein the warning is transmitted to a different computer system associated with an administrator.

7. The method of claim 1, further comprising, in response to detecting a Nagling condition on the network connection, incrementing by the Nagle detector a Nagle monitor counter.

8. The method of claim 1, further comprising, in response to detecting a Nagling condition on the network connection, displaying by the sender computer system the warning to a user.

9. The method of claim 1, further comprising, in response to detecting a Nagling condition on the network connection, recording by the Nagle detector an indication of the Nagling condition in a log.

10. The method of claim 1, further comprising:
wherein the network connection has an implemented Nagle algorithm; and
in response to detecting a Nagling condition on the network connection, turning off the Nagle algorithm for the network connection by the sender computer system.

* * * * *